July 14, 1970 F. J. SAIA ET AL 3,520,720

DIES AND DIODE AND METHOD

Filed Dec. 13, 1966

INVENTORS.
FRANK J. SAIA,
GILBERT N. McINTYRE,
HARVEY J. COHEN,

BY [signature]

ATTORNEY.

United States Patent Office 3,520,720
Patented July 14, 1970

3,520,720

DIES AND DIODE AND METHOD

Frank J. Saia and Gilbert N. McIntyre, Costa Mesa, and Harvey J. Cohen, South Laguna, Calif., assignors to Hughes Aircraft Company, Culver City, Calif., a corporation of Delaware Filed Dec. 13, 1966, Ser. No. 601,402
Int. Cl. H01l 1/10
U.S. Cl. 117—201 8 Claims

ABSTRACT OF THE DISCLOSURE

The invention relates to a method and a semiconductor die body that is encapsulated with boron and phosphorous materials.

Boron phosphate or oxides of boron and of phosphorous coatings are applied to the die body and dried.

This invention relates to an improvement in semiconductor dies and improved method of high temperature sealing diodes therewith. More particularly, the improvement relates to a silicon die body provided with boron and phosphorous oxide encapsulating coating as a means for preventing voltage degradation during final seal, use and application of glass encapsulated diodes of the PN rectifying junction type and method of preparing the same.

As disclosed in the copending application, likewise assigned to the present assignee, Ser. No. 462,357, now Pat. 3,430,335, of Allen Gee, and application Ser. No. 473,779, now Pat. 3,354,258 of Frank J. Saia and Gilbert N. McIntyre, the manufacture and use of encapsulated silicon diodes is known. Usually the manufacture and sealing has been effected more or less efficiently only in an oxygen atmosphere or oxygen-nitrogen atmosphere to lessen voltage degradation. Such manufacture is costly and still may leave much to be desired in that oxygen is detrimental to the seal leaving a scale thereunder which is attacked by an acid condition and with a mixture of oxygen and nitrogen the voltage degradation is found to vary from 40% to 80% on a 100-volt unit. Although pure nitrogen provides seals with greater pull strength than oxygen seals exhibit, voltage degradation increases as the nitrogen content is increased.

Thus, it will be recognized this art requires a solution to such problems in combination with an answer which provides simplicity with low cost of materials and labor.

Accordingly, it is an object of this disclosure to provide in this art an improved method simplifying and economizing in the production of silicon diode devices of the PN rectifying junction type with a boron-phosphate encapsulated die, and the product obtained therewith and thereby.

A further object of this disclosure is a provide an improvement economizing in the method of encapsulating a semiconductor silicon die body in a combined oxide coating of phosphorous and boron, and the products obtained therefrom.

Additional objects and advantages will be apparent from the following description and in reference to the accompanying drawing wherein.

To the accomplishment of the foregoing and related ends, this invention, improvement and discovery then comprises the features hereinafter more fully described and inherent therewith, and as particularly pointed out in the claims, the following description setting forth in more detail certain illustrative embodiments, these being indicative, however, of but a few of the various ways in which the principles of the disclosure, as it pertains to the method of making dies and encapsulating a die material therefor, and the products thereof as embodied herein.

Figure 1:
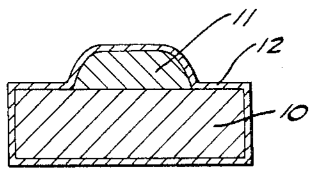
FIG. 1 is a cross-sectional view of a crystal die body encapsulated with a coating as embodied herein.

With reference to the drawing, FIG. 1 illustrates the silicon crystal semiconductor die body 10 preferably provided with a conventional conductor metal contact button (silver foil) 11, with the crystal and conductor metal contact button having a coating 12 of the oxides of boron and phosphorous thereover. While the coating is preferably applied to the assembly, as indicated, it is also applicable to the crystal by treatment with a solution of the oxide, or oxides, and the button 11 placed thereagainst in assembling the diode structure. For example, a solution mixture was prepared by mixing 4 grams of phosphorous pentoxide and 10 grams of boron oxide in 100 milliliters of water. The crystal, with the metal contact, was placed in the solution for a few moments, taken out and completely dried by evaporation of the water under an infrared heat lamp. When examined under magnification, the die body showed a white coating of the phosphorous and boron oxides coating mixture, as illustrated.

Otherwise, a solution of 10 grams boron phosphate ($BPO_4$) in 100 ml. of water effects a suitable coating. Any suitable volatile solvent forming a solution of boron and phosphorous oxides may be used. In this respect, it appears that different solution concentrations may be prepared up to the saturation levels of the oxide material, but preferably maintaining an excess proportion of boron oxide to the phosphorous oxide when the oxides are added separately. The crystal portion is coated therewith in whole or in part with the metal contact thereon or subsequently placed thereon. In subsequent final heating (sealing), the coating becomes sufficiently fluid, effecting suitable ohmic contact in the diode structure.

Figure 2:
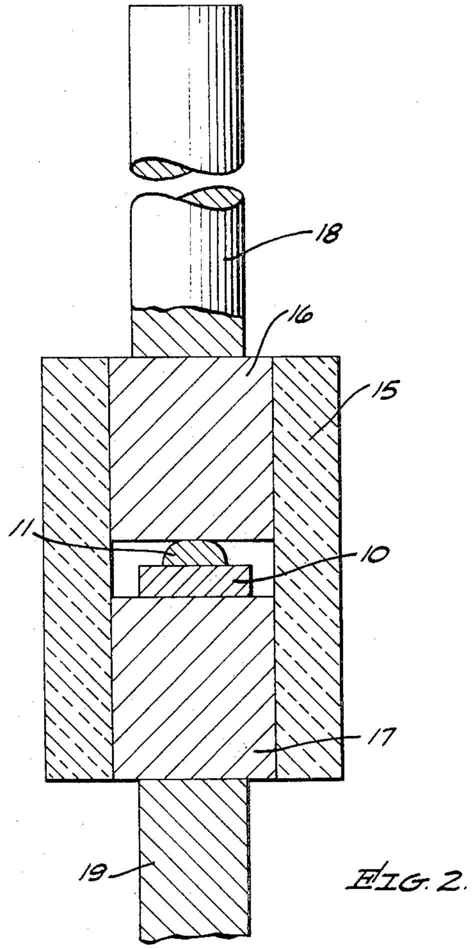
FIG. 2 is a side elevation of a glass sealed diode structure utilizing the die of FIG. 1.

In application, the coated die, while applicable to the other diode structures, as in place of the dies shown in the aforementioned applications, is preferably positioned as illustrated in FIG. 2 within a glass encapsulating package body 15 enclosed at each end by conventional Dumet studs 16 and 17 of glass sealing constituency. The studs 16 and 17 are of conventional nickel-iron composition coated with copper and borate for effecting a glass seal upon heating the assembly. The extended stud tail ends 18 and 19 are of the same composition as studs 16 and 17 and may either be parts thereof or serve as mounting means for the glass encapsulated die body.

Figure 3:
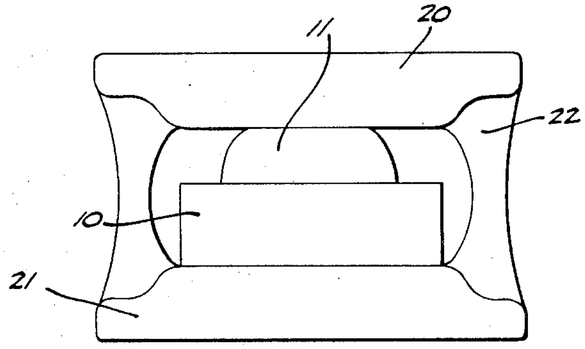
FIG. 3 is a modification of FIG. 2.

Otherwise, as illustrated in FIG. 3, the microglass package is provided by placing the coated oxide die body, as described, with a silver button 11 thereon between a pair of conventional silver plated alloy caps 20 and 21 seated against the open ends of glass (ceramic) ring body 22. The assembly is placed under pressure sufficient to firmly press the parts together and heating the assembly to on the order of 500°–900° C. This effects a composite sealing of the glass to metal and provides suitable electrical contact between the silver button 11, silicon body 10, and the respective stud and metal coated ends 21 and 20 of the glass (ceramic) enclosure.

In forming the diode structure of FIG. 2, relatively likewise, the coated die crystal body 10 is aligned under pressure between the stud portions 16 and 17 with the glass sleeve (packaging body) 15 slide thereover. When placed under pressure and heated to a temperature of 500° to 900° C., in a nitrogen atmosphere, to fuse and seal the studs 16 and 17 to the glass body 15, the die coating in contact therewith becomes sufficiently fluid to effect ohmic contact between the base of stud 17 and button 11 and the side or base of the crystal body in ohmic contact with the end of stud 16. Otherwise, when the coating is on the crystal and the button 11 placed thereagainst, the temperature of heat sealing or bonding of the studs 16 and 17 within the glass sleeve 11, effects sufficient melting of the coating to provide suitable ohmic contact between the button 11 and crystal 10.

The improvement effects long term operating stability, whereas, products not utilizing this coating will have reverse current degradation.

In providing the above coating mixture for the crystal die material in the dual studded glass microseal packaging, as illustrated, the problem of deliquescence of the phosphorous and tendency to absorb water, including presence of detrimental impurities caused by the glass to metal sealing in the nitrogen atmosphere ordinarily effecting voltage degradation, were discovered not to be present. In continuous experimental use at a high temperature bias (200° C.) at 50 volts for 100 hours, there has been no failure.

As an alternative method of application of the oxide coating, solutions of $BPO_4$ of varying concentrations have been prepared in comparison with dipping the crystal in a $BPO_4$ powder (boron phosphate), and the crystal die dipped therein and dried to provide a coating thereover with excellent voltage retention after final seal. The solution preparations consisted of:

(1) 3 gms. $BPO_4$ in 100 ml. cold water
(2) 4 gms. $BPO_4$ in 100 ml. hot water
(3) 4 gms. $BPO_4$ in 100 ml. methyl alcohol.

After dipping a die crystal in each of the above compositions and drying the coating provided thereby, each sample, including the die sample dipped in powdered $BPO_4$, gave the following results:

$BV$—90 v., $IR$ @30 v.<20 na., and $E_F \lesssim .90$ v. @ 100 ma.

[breakdown voltage, reverse leakage, forward voltage (na.)]

As some variations and modifications of this invention, improvement or discovery, as herein set forth may be made without departing from the spirit and scope thereof, the specific embodiments described are given by way of example illustrative of the improvements provided. Accordingly, we desire to have it understood that changes may be made within the scope of the following claims without departing from the embodiment and spirit of our invention and improvement.

What is claimed is:

1. The method of preparing the surface of a semiconductor crystal die body with a coating of an oxidized combination of boron and phosphorous comprising the steps of preparing a coating composition selected from the gorup consisting of the combined oxides of boron and phosphorous, or the phosphate combination of boron and phosphorous, coating the surface of a semiconductor crystal with said combination and effecting the coating of the said combination thereon.

2. The method of claim 1 wherein the boron and phosphorous are mixed and applied in the form of boron phosphate and effect a coating of an oxidized combination of boron and phosphorous on said semiconductor.

3. The method of claim 1 wherein the coating is a combination of phosphorous pentoxide and boron oxide.

4. The method of claim 1 wherein the coating is $BPO_4$.

5. The method of claim 1 wherein the boron oxide content is in excess of the phosphorous oxide content.

6. The method of claim 1 wherein said crystal die body is provided with a conductor metal contact and the said coating is effected thereover.

7. A semiconductor silicon die body having a combination of the oxides of boron and of phosphorous coating thereon.

8. A semiconductor crystal die body having a coating of the phosphate combination of boron and phosphorous thereon.

References Cited

UNITED STATES PATENTS

| | | | |
|---|---|---|---|
| 3,296,503 | 1/1967 | Klossika | 317—234 X |
| 2,798,189 | 7/1957 | Alexander. | |

ALFRED L. LEAVITT, Primary Examiner

A. GRIMALDI, Assistant Examiner

U.S. Cl. X.R.

29—588; 317—234